Jan. 16, 1940.　　　K. M. FRENCH　　　2,187,449
WRIST-ATTACHED CAMERA
Filed Aug. 6, 1938　　　2 Sheets-Sheet 1
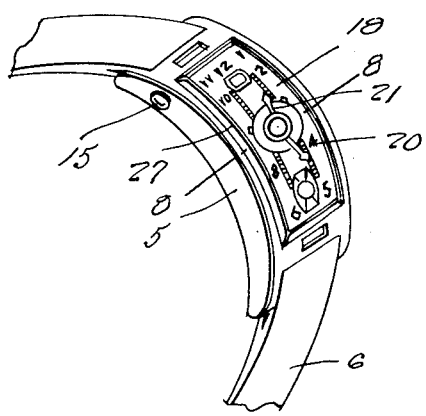
Fig. 1.
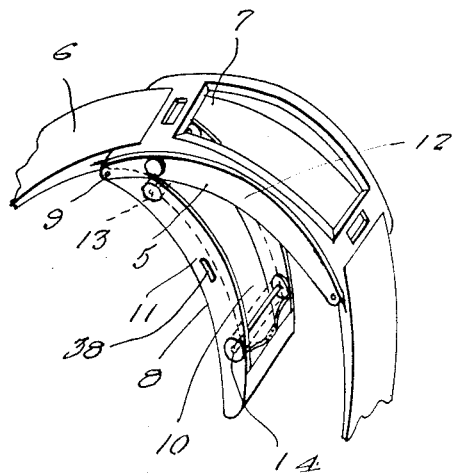
Fig. 3.
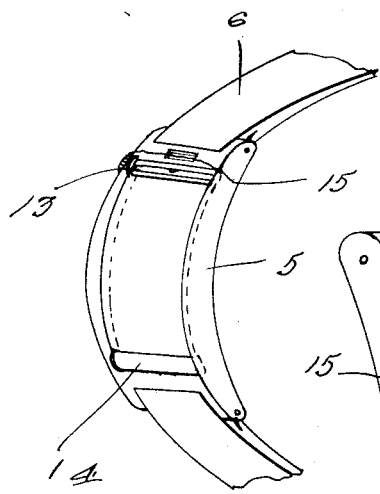
Fig. 4.
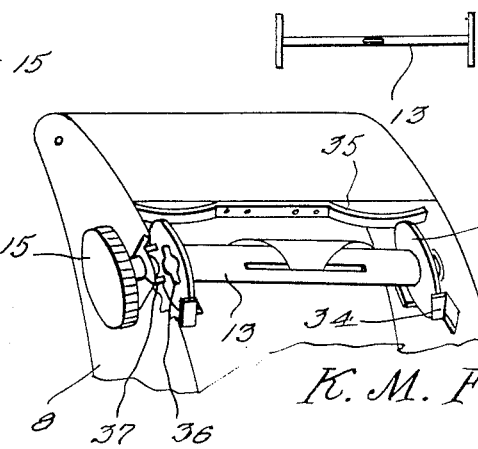
Fig. 7.
Fig. 9.
Inventor
K. M. French
By Clarence A. O'Brien
and Hyman Berman
Attorneys Jan. 16, 1940.　　K. M. FRENCH　　2,187,449
WRIST-ATTACHED CAMERA
Filed Aug. 6, 1938　　2 Sheets-Sheet 2
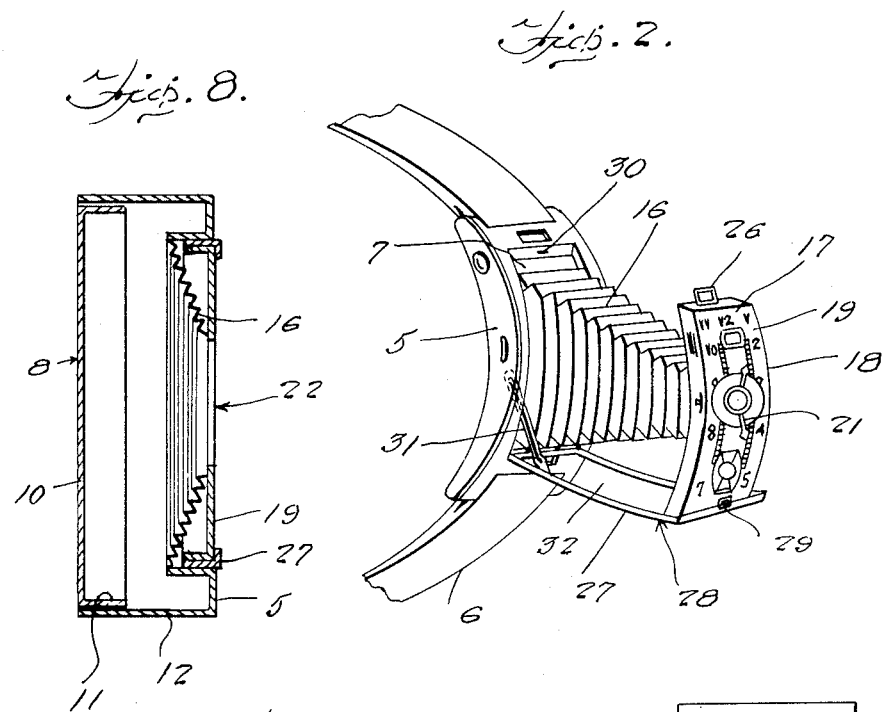
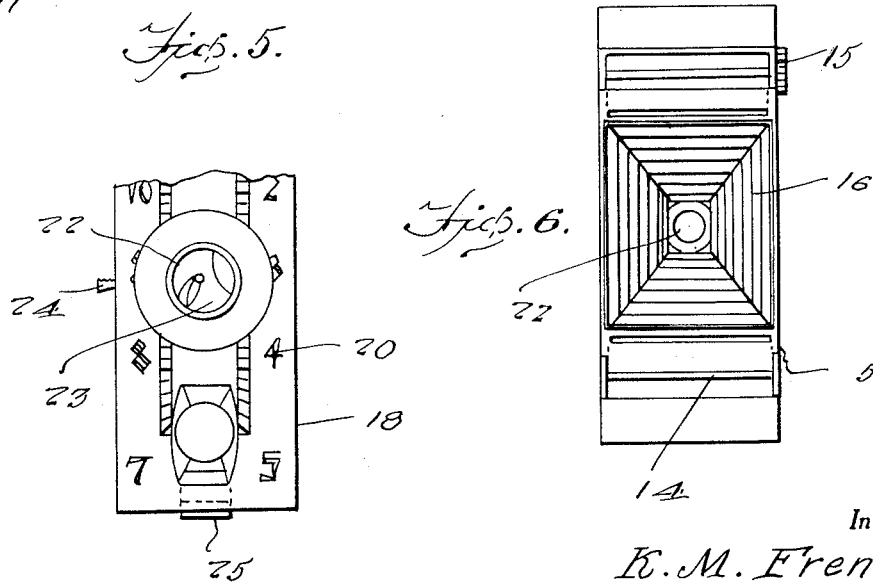
Inventor
K. M. French
By Clarence A. O'Brien
and Hyman Berman
Attorneys Patented Jan. 16, 1940

2,187,449

UNITED STATES PATENT OFFICE 2,187,449

WRIST-ATTACHED CAMERA

Kieth M. French, Watertown, N. Y.

Application August 6, 1938, Serial No. 223,536

11 Claims. (Cl. 95—40)

The present invention relates to cameras and has for its primary object to provide a mechanism of this character constructed in compact form and mounted in operative position in a curved frame similar to frame of a wrist watch, said frame having straps attached thereto for securing the frame to the wrist of a person.

Another object of the invention is to provide a camera of this character adapted, when folded, to simulate a wrist watch and adapted to be opened in a conventional manner similar to conventional folding cameras for taking pictures.

A still further object is to provide an apparatus of this character of simple and practical construction, which is efficient and reliable in performance, relatively inexpensive to manufacture and otherwise well adapted for the purposes for which the same is intended.

Other objects and advantages reside in the details of construction and manner of operation as more fully hereinafter described and claimed, reference being had to the accompanying drawings forming part hereof, wherein like numerals refer to like parts throughout, and in which:

Figure 1 is a perspective view of the wrist camera in folded position and showing portions of the wrist strap attached thereto.

Figure 2 is a similar view showing the camera in open position.

Figure 3 is a similar view showing the frame with the camera removed and showing the backing plate of the case open for receiving the film.

Figure 4 is a perspective view of the backing plate provided with a film roll and the supporting frame in closed position and with the front frame removed.

Figure 5 is a fragmentary front elevational view of the lower portion of the face of the camera.

Figure 6 is a rear elevational view of the camera with the backing plate removed.

Figure 7 is a detail of one of the film rolls.

Figure 8 is a transverse sectional view taken substantially on a line 8—8 of Figure 1, and Figure 9 is a fragmentary perspective view of one end of the spool holding frame.

Referring now to the drawings in detail, the numeral 5 designates an inner camera frame which is curved longitudinally and to the upper and lower ends of which are secured a wrist strap 6 for attaching the frame to the wrist of a person.

The central portion of the frame is formed with an elongated opening 7 and to the upper edge of the frame, rearwardly thereof, is pivotally secured a back 8 as at 9, the back 8 including a rear wall 10 and angular sides 11 adapted to telescope and conformably fit within the sides 12 of the frame 5.

To the side walls 11 of the back piece are rotatably supported upper and lower film reels 13 and 14 respectively, said reels or spools being removably positioned in the back and adapted to carry a roll of film for winding and unwinding on said spools.

The frame 5 at the side walls 12 carries manipulating wheels 15 adapted for engagement with the respective spools 13 and 14 to wind the film thereon.

Secured to the under side of the outer frame 5 is a folding camera illustrated in Figure 2 of the drawings and including a conventional bellows 16 adapted to be moved into and out of position through the opening 7 and to the outer end of which is secured a conventional type of camera mechanism 17 which includes a casing 18 adapted to fit snugly within the opening 7 and likewise curved longitudinally, the casing having a face 19 ornamented to simulate a watch including the dial 20 and hands 21. At the hub portion of the hands is provided an opening 22 within which is mounted the camera shutter 23 adapted to be operated by a lever 24 projecting outwardly through the side of the casing 18. Adjacent the bottom of the dial 20 and projecting through the bottom of the casing 18 is a slidably mounted handle 25 designed for adjusting time exposures. A view finder indicated at 26 is movable into and out of position through an opening in the top of the casing 18.

The bottom edge of the casing 18 is slidably carried by the longitudinal side members 27 of a crystal frame 28, the crystal frame being hingedly mounted at its inner end within the opening 7 for swinging into and out of position within said opening, the outer end of the crystal frame constituting a support for the casing 28 when the camera is in an open position as shown in Figure 2 of the drawings. Cooperating catch members 29 and 30 are carried respectively by the outer end of the crystal frame 28 and by the top of the opening 7 to secure the crystal frame in inward folded position. A brace 31 is pivoted to the frame 5 at the side 27 of the crystal frame to assist in supporting the same in its open position. It will be apparent that when the camera is in its folded position and the crystal frame 28 closed against the frame 5 that the crystal 32 mounted in the frame will cover the front of the casing 18 in a manner similar to that of a watch.

In Figure 9 I have illustrated the mounting for one of the film spools, the flange 33 of the spool being held against a pair of lugs 34 by a leaf spring 35 secured to the end of the backing plate 8. The end of the spool is formed with a slot 36 for receiving the key 37 on the wheel 15 to manipulate the spool in the usual manner.

The frame 5 is releasably held in closed position with the backing plate 8 by a raised catch 38. While the invention is illustrated with the frame curved to conform to the wrist of a person, it will be understood the camera mechanism is of conventional construction and is arranged in the frame in a suitable manner for accomplishing its intended purpose.

It is believed the details of construction and manner of use of the device will be readily understood from the foregoing without further detailed explanation.

Having thus described the invention, what I claim is:

1. A wrist camera comprising a camera frame including a curved back adapted to conformably fit the curvature of the wrist of a person, means for collapsibly mounting a camera in the frame and wrist attaching means secured to the frame.

2. A wrist camera comprising a frame having a curved back adapted to conformably fit the curvature of the wrist of a person, said frame having an opening in its front portion and a collapsible camera carried by the frame and movable into and out of collapsed position in said opening.

3. A wrist camera comprising a frame curved in conformity with the curvature of the wrist of a person and having an opening therein and a collapsible camera carried by the frame and movable into and out of collapsed position in said opening, said camera including a shutter casing adapted to close the opening when the camera is in its collapsed position.

4. A wrist camera comprising a wrist-attached frame curved in conformity with the wrist of a person and a folding camera carried by said frame and including a shutter casing constituting the front of the frame when the camera is folded therein.

5. A wrist camera comprising a wrist-attached frame curved in conformity with the curvature of the wrist of a person, said frame having an opening therein, a folding camera carried by the frame and movable into and out of position through said opening, said camera including a shutter casing fitted in said opening when the camera is in a closed position and an open frame slidably supporting the lower end of said casing, said open frame being hingedly connected at one end within the opening of said first named frame.

6. A wrist camera comprising a wrist-attached frame, a film supporting backing plate for the frame, said frame and backing plate being curved in conformity with the curvature of the wrist of a person and hingedly connected at one end to each other, said frame having an opening therein and a foldable camera carried by said frame and movable into and out of position with respect to said opening.

7. A wrist camera comprising a wrist-attached frame, a film supporting backing plate for the frame, said frame and backing plate being curved in conformity with the curvature of the wrist of a person and hingedly connected at one end to each other, said frame having an opening therein and a foldable camera carried by said frame and movable into and out of position with respect to said opening, said camera including a bellows connected at its inner end to said frame, a shutter casing attached to the opposite end of the bellows, said casing conformably fitting into said opening when in folded position and means carried by the frame supporting the casing when in open position.

8. A wrist camera comprising a wrist-attached frame, a film supporting backing plate for the frame, said frame and backing plate being curved in conformity with the curvature of the wrist of a person and hingedly connected at one end to each other, said frame having an opening therein and a foldable camera carried by said frame and movable into and out of position with respect to said opening, said camera including a bellows connected at its inner end to said frame, a shutter casing attached to the opposite end of the bellows, said casing conformably fitting into said opening when in folded position and means carried by the frame supporting the casing when in open position, said means being also foldable into and out of position in said opening.

9. A wrist camera comprising a wrist-attached frame, a film supporting backing plate for the frame, said frame and backing plate being curved in conformity with the curvature of the wrist of a person and hingedly connected at one end to each other, said frame having an opening therein and a foldable camera carried by said frame and movable into and out of position with respect to said opening, said camera including a bellows connected at its inner end to said frame, a shutter casing attached to the opposite end of the bellows, said casing conformably fitting into said opening when in folded position and means carried by the frame supporting the casing when in open position, said camera including a casing and a crystal frame adapted to support the casing when the camera is in an open position and adapted to cover the casing when the camera is in a closed position.

10. A wrist camera comprising a wrist-attached frame, a film supporting backing plate for the frame, said frame and backing plate being curved in conformity with the curvature of the wrist of a person and hingedly connected at one end to each other, said frame having an opening therein and a foldable camera carried by said frame and movable into and out of position with respect to said opening, said camera including a bellows connected at its inner end to said frame, a shutter casing attached to the opposite end of the bellows, said casing conformably fitting into said opening when in folded position and means carried by the frame supporting the casing when in open position, said camera including a shutter casing and a bellows connecting the casing to said frame and a crystal frame pivoted to the first named frame and adapted to support the casing when the camera is in an open position and to cover the casing when the camera is in a closed position.

11. In a device of the class described, a camera frame including a back portion curved to conformably fit against the wrist of a person, means for collapsibly mounting a camera therein and means at opposite sides of the frame for attaching a wrist strap thereto.

KIETH M. FRENCH.